(12) United States Patent
Musicco

(10) Patent No.: US 7,087,258 B2
(45) Date of Patent: Aug. 8, 2006

(54) ROASTING OF GROUND SEEDS FOR ALIMENTARY USE

(75) Inventor: Giuseppe Musicco, Arzago d'Adda (IT)

(73) Assignee: Zini Prodorri Alimentari S.r.l., Milan (IT)

( * ) Notice: Subject to any disclaimer, the term of this patent is extended or adjusted under 35 U.S.C. 154(b) by 448 days.

(21) Appl. No.: 10/324,527

(22) Filed: Dec. 18, 2002

(65) Prior Publication Data
US 2004/0121055 A1    Jun. 24, 2004

(51) Int. Cl.
*A23F 5/00* (2006.01)

(52) U.S. Cl. ............ 426/595; 426/596; 426/598; 426/640; 426/473; 426/518; 426/520; 426/524

(58) Field of Classification Search ........ 426/594–596, 426/598, 629, 640, 466, 473, 518, 520, 524
See application file for complete search history.

(56) References Cited

U.S. PATENT DOCUMENTS

| | | | |
|---|---|---|---|
| 2,097,591 A | | 11/1937 | Finley |
| 3,544,331 A | * | 12/1970 | Hair ........................... 426/388 |
| 3,706,574 A | | 12/1972 | Mahlmann et al. |
| 4,081,569 A | * | 3/1978 | Gregg ........................ 426/595 |
| 4,165,752 A | * | 8/1979 | Bustamante ................ 131/359 |
| 4,428,970 A | * | 1/1984 | Laudano ..................... 426/385 |
| 4,737,376 A | * | 4/1988 | Brandlein et al. .......... 426/467 |
| 5,332,591 A | | 7/1994 | Ogden |
| 5,465,656 A | | 11/1995 | Ogden |
| 5,958,497 A | | 9/1999 | Grimm et al. |
| 5,972,409 A | | 10/1999 | Liu et al. |
| 6,090,423 A | * | 7/2000 | Wetzel ....................... 426/233 |
| 6,171,635 B1 | | 1/2001 | Zhao |

FOREIGN PATENT DOCUMENTS

| | | | |
|---|---|---|---|
| DE | 832 535 | * | 1/1952 |
| DE | 832 535 A | | 1/1952 |
| EP | 1269855 A1 | * | 2/2003 |
| FR | 2 302 043 A | | 9/1976 |
| FR | 2593055 A | * | 7/1987 |
| GB | 1 289 437 A | | 9/1972 |
| GB | 1339700 | * | 12/1973 |
| JP | 404304871 A | * | 10/1992 |
| SU | 1738216 A1 | * | 6/1992 |

* cited by examiner

*Primary Examiner*—Drew Becker
(74) *Attorney, Agent, or Firm*—Akerman Senterfitt

(57) ABSTRACT

A process for producing roasted coffee or a surrogate thereof in powder form from seeds obtained from the fruits of coffee plants, or seeds of barley, rye, oats, and wheat, wherein a powder obtained by grinding said seeds is dried to a moisture content of 5 to 10% and subjected to roasting. Preferably, the roasting is carried out continuously, at a lower temperature and for a shorter time than conventional processes, to a stream of said powder that is arranged in a thin and turbulent dynamic layer run along a wall in heat exchange relationship therewith, with the wall being maintained at a set temperature of at least 180° C.

5 Claims, 1 Drawing Sheet

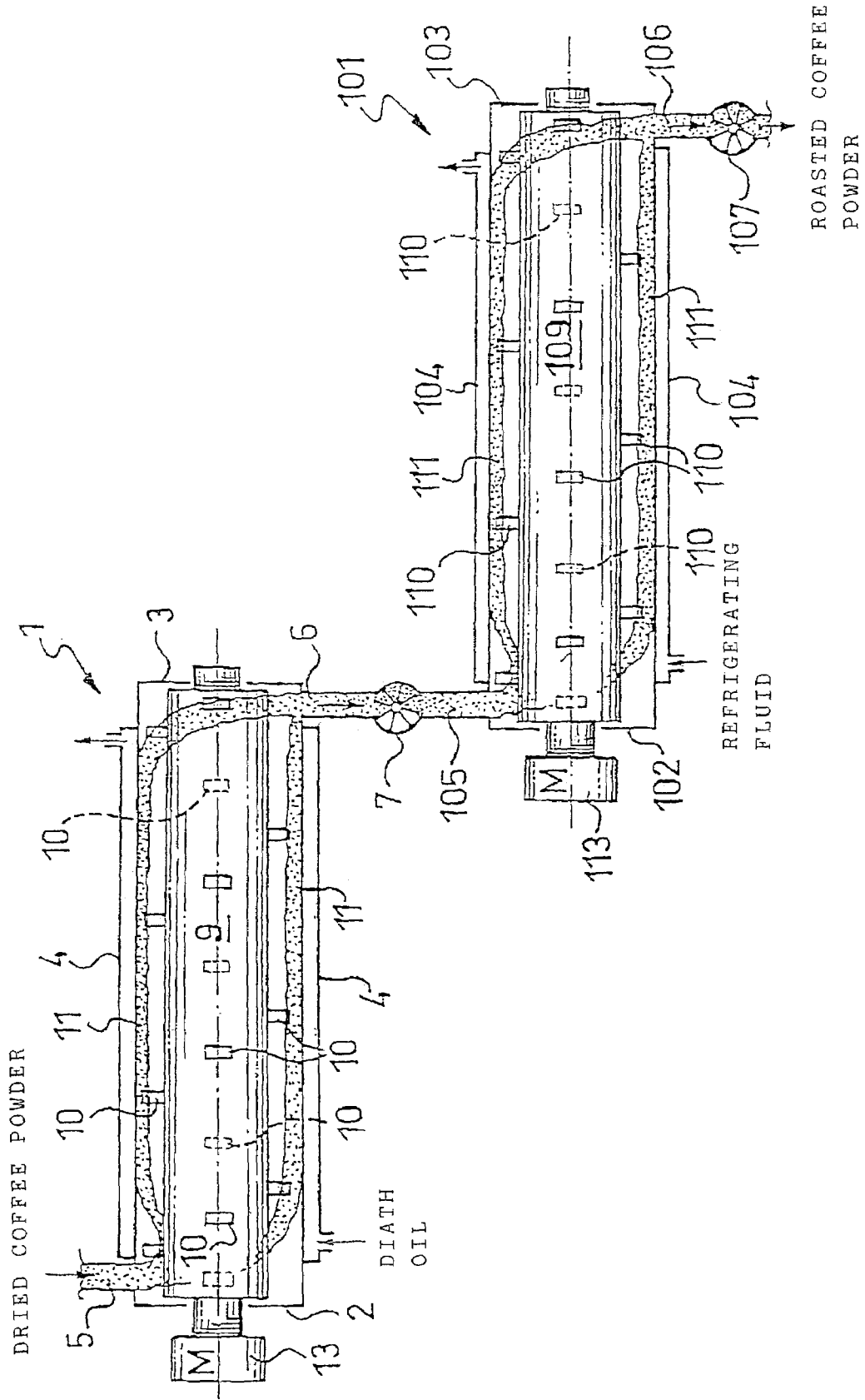

ROASTING OF GROUND SEEDS FOR ALIMENTARY USE

FIELD OF THE INVENTION

The present invention relates to a process for continuously roasting seeds intended for alimentary use, especially seeds that, in a roasted (or toasted) and ground state, are used in the preparation of drinks and infusions, e.g. barley, rye, oats, wheat, and especially coffee seeds.

Reference will be made throughout this description to coffee seeds, although the inventive process is also suitable for processing any other seeds from which drinks or infusions are prepared to be used as coffee surrogates.

BACKGROUND OF THE INVENTION

As is well known, ordinary coffee is made from the seeds of the fruits of a plant belonging to the genus Coffea by a series of operations.

These operations start with removing the seeds from the fruit and include seed washing, drying and decorticating operations.

The typically green-colored coffee seeds are then roasted, i.e. applied heat at a set temperature, for a length of time selected to give coffee the desired flavor and taste.

Thereafter, the roasted seeds are cooled, ground to a desired grain size and packaged, usually under a vacuum to best preserve their flavor.

Also recognized is that, of all the above coffee seed processing operations, the roasting process is of vital importance to the quality of the end product.

The roasting process has been carried out traditionally in continuous, or discontinuous, drum apparatus in which a chosen blend of green coffee seeds, usually from different crops, is heated to a temperature of 200° to 220° C. by means of a stream of hot air and kept at such a temperature for a time that varies between 12 and 20 minutes, depending on the flavor and taste to be given to the end product.

A drawback of traditional roasting is that the coffee seed has to be applied a relatively high temperature through a sufficient time span for the roasting effect to reach the core region of the seed and so yield a coffee product of proper quality.

Under the above conditions, the outer portions of the seeds, or whole seeds of a smaller size, are roasted to excess, which affects the quality of the end product because of alteration or decomposition of many substances therein contained.

More particular, in the traditional roasting process, sugary substances in the seeds tend to caramelize, fats tend to oxidise, cellulose tends to char enough to lose its capacity for trapping flavor, and small amounts of decomposition products are formed such as hydroquinone, methylamine, pyrrole, and acetone.

Another drawback of traditional roasting is that a large proportion of the volatile substances responsible for the coffee flavor, and either contained originally in the seeds or generated by the roasting process, is lost together with the fumes escaping through the chimney. Caffeine too goes wasted in substantial proportions (up to 20% of its original amount), either by sublimation or decomposition. It has been found that caffeine has, itself, anti-mutagenous activity, in the sense that it can inhibit the mutagenous effects of a number of chemicals. Caffeine is reportedly effective to restore the mitosis and phosphorylation cycle back to normal in irradiated cells.

But when caffeine decomposes, it may release aliphatic di-carbonyl compounds that are highly reactive, as well as being mutagenous for mammalian cells.

Lastly, traditional coffee seed roasting is never applied evenly to the seeds being processed, because the process depends heavily on such physical parameters of the seeds as their size, density, and moisture content, which may vary considerably.

The underlying technical problem of this invention is to provide a process for producing roasted coffee or a surrogate thereof, which can overcome the aforementioned drawbacks of the prior art. In other words, a process in which roasting can be applied uniformly and without the seeds becoming over-roasted, so as to yield a quality product.

BRIEF SUMMARY OF THE INVENTION

This problem is solved by a process for producing roasted coffee or a surrogate thereof in powder form from seeds obtained from the fruits of coffee plants, as well as from seeds of barley, rye, oats, and wheat, which process comprises the following steps:
  grinding said seeds into a powder of a predetermined grain size;
  drying said powder down to a predetermined moisture content; and
  subjecting said powder to roasting.

According to a preferred embodiment of the invention, the roasting step should, in turn, conveniently comprise the following steps:
  producing a continuous stream of said powder arranged in a thin and turbulent dynamic layer;
  causing said powder to flow by letting said thin and turbulent dynamic layer run along a wall, maintained at a set temperature of at least 180° C., in heat exchange relationship with said wall; and
  cooling the roasted powder.

This invention is based on the finding that, when the roasting process is applied to a coffee powder obtained from ground coffee seeds and dried, and preferably arranged in a thin and turbulent dynamic layer, the roasting temperature and residence time can be significantly lower, to yield roasted coffee of a good quality. Like results have been obtained with the seeds of such cereals as barley, oats, rye and wheat.

In particular connection with coffee, it is noteworthy that, unlike prior processes, the process of this invention provides for the coffee seeds to be ground and dried before the roasting step.

The grinding step is carried out such that a coffee powder is obtained having a predetermined grain size that can be same as that of conventionally-roasted ground coffee sold ready for consumption.

Preferably, the average grain size of the coffee powder is in the range of 0.5 to 2 mm.

The coffee powder may be dried in conventional dryers, preferably in a turbo-dryer by this Applicant, operating at a controlled temperature.

During this step, the coffee powder is dried down to a set moisture content, preferably of 5 to 10%.

During the roasting step of the process according to the invention, the powder arranged into a thin and turbulent dynamic layer is heated at a temperature not higher than 180° C., preferably of 160° to 170° C., by means of a heat exchange with a wall that is maintained at a temperature in the 180° C. to 200° C. range.

Roasting time will vary generally between 3 and 5 minutes, and is substantially shorter than in conventional roasting.

Advantageously, the process of this invention is implemented by using a turbo-mixer as the roasting apparatus or roaster; this turbo-mixer comprises a cylindrical tubular body formed with a heating jacket for heating its inner wall and with inlet and discharge openings for the powder to be roasted and the roasted powder, respectively, said cylindrical body having a bladed rotor mounted rotatably on its interior, and the blades being helically arranged and oriented to drive the powder from said inlet openings to said discharge openings.

When the above apparatus is used, the process for continuously producing roasted coffee or a surrogate thereof in powder form from seeds selected from a group comprising seeds obtained from the fruits of coffee plants, as well as seeds of barley, rye, oats, and wheat, according to this invention, is characterized in that it comprises the following steps:

grinding said seeds into a powder of a predetermined grain size;

drying said powder down to a predetermined moisture content;

continuously feeding a stream of said powder into said roaster, with the inner wall of said roaster maintained at a temperature of 180° to 200° C. and the bladed rotor driven at 500 to 1000 RPM;

roasting said powder, with formation, since its introduction into said roaster, of a thin and turbulent dynamic layer driven by said rotor blades towards the discharge opening of said roaster in heat exchange relationship with the roaster heated wall, said rotor blades concurrently mechanically working the powder grains in said thin dynamic layer; and continuously discharging a stream of roasted powder and the fumes from the roasting process.

The outflow of roasted powder may be conveniently taken, along with the roasting fumes, to a second turbo-mixer, which is a similar construction as the previous one but provided with a cooling jacket to serve a condenser function.

Accordingly, it comprises a cylindrical tubular body formed with a cooling jacket for cooling its inner wall and with inlet and discharge openings for the roasted powder, said body having a bladed rotor mounted rotatably on its interior, the blades being helically arranged and oriented to drive the roasted powder from said inlet openings to said discharge openings.

Optionally, a suction fan may be connected to the condenser to exhaust part of those fumes released from the roasting process which are uncondensable under the processing conditions adopted for powder cooling.

In this embodiment of the inventive process, the latter additionally comprises the following steps:

continuously feeding the stream of roasted powder and the roasting fumes issuing from said roaster into said condenser, with the inner wall of the condenser maintained at a temperature in the range of −5° C. to 5° C. and its bladed rotor driven at the same rotational speed as the bladed rotor of the roaster;

cooling said powder and roasting fumes, with formation, since their introduction into said condenser, of a thin and turbulent dynamic layer driven by the blades of the condenser rotor towards the discharge opening of said condenser in heat exchange relationship with the condenser wall, said blades concurrently mechanically working the powder grains in said thin and turbulent dynamic layer; and continuously discharging a stream of cooled roasted powder and uncondensed fumes.

In one aspect of the inventive process, a part of the fumes released from the roasting process that would be uncondensable under the cooling conditions provided may be stripped simultaneously as the powder is cooled in the condenser.

The roasted powder issuing from the roaster may be dumped into the condenser by gravity, with the discharge openings of the roaster communicated to the inlet openings of the condenser, or alternatively, be transported to said inlet openings of the condenser by a suitable means, e.g. an auger conveyor.

The stream of roasted powder exiting the roaster and the condenser may be regulated through a continuous distributor, e.g. a rotary distributor.

In another of its aspects, the inventive process may further comprise a step of drying the end product at a low temperature in order to lower its moisture content.

The features and advantages of this invention will be apparent from the following description of an embodiment thereof, given by way of non-limitative example with reference to the accompanying drawing, of which the single FIGURE shows schematically an apparatus implementing this process.

With reference to said FIGURE, an apparatus implementing the inventive process comprises basically a first turbo-mixer 1, used for roasting the coffee powder or the like product and hereinafter referred to as the "roaster", and a second turbo-mixer 101, used for carrying out the cooling/condensing step and referred to as the "condenser" hereinafter.

The above roaster and condenser are of identical construction, so that only the roaster will be described in detail.

DETAILED DESCRIPTION OF THE DRAWING

In the FIGURE, the component parts of the condenser are denoted by the same numerals as those of the roaster, increased by 100.

DETAILED DESCRIPTION OF THE INVENTION

The roaster comprises a cylindrical tubular body 1 having its longitudinal axis laid horizontally and being closed by end walls 2 and 3 at its opposed ends. The roaster body 1 is provided coaxially with a heating jacket 4 through which a diathermic or another fluid is circulated to maintain the inner wall of the roaster body 1 at a predetermined set temperature.

The tubular body 1 is formed with an inlet opening 5 for introducing a dried powder of seeds (coffee, barley, rye, oats, or wheat) to be roasted, and with a discharge opening 6 for the roasted powder. The discharge opening 6 is communicated to an inlet opening 105 of the condenser 101, receiving an infeed stream of roasted powder as suitably regulated by a rotary distributor 7.

Rotatably mounted inside the tubular body 1 is a bladed rotor 9, whose blades 10 are helically arranged and oriented to centrifuge the powder being roasted at the same time as they drive it towards the discharge opening 6.

A motor 13 turns the rotor 9 at 500 to 1000 RPM.

Turbo-mixers manufactured by this Applicant have proved suitable to ensure constant throughput and reliable operation.

In the inventive process, a stream of a powder of said seeds—which powder has been obtained by grinding the seeds to a predetermined grain size, and has been dried to a predetermined moisture content—is fed continuously into the roaster 1 through the inlet opening 5. As it enters the roaster, this powder is picked up and worked mechanically by the rotor blades 10 at an appropriate rotational speed of the rotor 9.

In particular, the blades 10 of the rotor 9 will centrifuge the powder against the inner wall 1a of the roaster to lay the powder into a thin tubular layer 11, since its entry into the roaster. This thin tubular layer is a turbulent dynamic layer urged towards the discharge opening 6 by the rotor blades 10.

As said thin and turbulent dynamic layer runs across the roaster wall 1a in heat exchange relationship therewith, the powder grains in it are continuously worked mechanically by the blades 10 of the rotor 9, the blade motion being effective to keep said powder in a homogeneously stirred state.

This allows the powder to be duly roasted at a lower temperature (never above 180° C.) than in the traditional roasting process, and with the powder residence time reduced to 3–8 minutes.

The roasting is applied evenly also because the powder, forming a thin and turbulent dynamic layer 11 and having a preset grain size, is kept deeply stirred in a homogeneous manner.

The stream of roasted powder leaving the roaster 1 through the discharge opening 6 is regulated by the rotary distributor 7 and fed, together with the roasting fumes, into the condenser 101 through its inlet opening 105.

Within the condenser 101, the roasted powder and the fumes are cooled, such that the volatile aromatic substances contained in the fumes becomes condensed onto the roasted powder.

The mechanical working of the roasted powder and the heat exchange take place in the condenser 101 in a similar manner as in the roaster 1 described above, excepting that the inner wall of the condenser 101 is cooled down to a predetermined temperature by a coolant fluid, e.g. a water and glycol mixture, being circulated through a cooling jacket 104 of said wall.

The finished product is then discharged from the condenser 101 through the discharge opening 106 as a regulated flow by a rotary distributor 107.

In the process of this invention, the temperature of the wall 1a of roaster 1 and the inner wall of condenser 101, and the rotational speed of the bladed rotors of roaster 1 and condenser 101, are selected for optimum seed powder roasting conditions, shorter processing time, and effective recovery in the condenser 101 of the aromatic substances from the roasting fumes.

Thus, for example, when coffee powder—having an average grain size of 0.5 to 2 mm, being obtained from ground seeds, and dried to a moisture content of 5 to 10%—is fed into the roaster at a rate of 100 kg/hour, a wall temperature of the roaster in the range of 180° to 200° C. and a wall temperature of the condenser in the range of −5° to 5° C. have shown to be specially favorable, at a bladed rotor speed of 500 to 1000 RPM in both the roaster and the condenser.

Of course, the turbo-mixers forming the roaster and condenser may be provided, contingent on technical and technological situations, with one or more inlet and discharge openings, and with one or more jackets for heating and cooling purposes, respectively, in order to establish a temperature gradient through the turbo-mixers for a target condition of heat exchange, for example.

EXAMPLE 1

Proceeding in accordance with the inventive process and using the apparatus described hereinabove, a coffee powder from seeds ground to an average grain size of 1 mm, dried to a moisture content of 5%, was fed continuously into the roaster 1 at a rate of 100 kg/h.

The wall temperature of the roaster 1 was controlled to a value around 180° C., and the bladed rotor driven at a constant speed of 800 RPM.

After a residence time of about 3 minutes, the roasted powder and the roasting fumes were transferred into the condenser 101, having its wall temperature controlled at about 0° C. and its rotor driven at the same speed as that of the roaster 1.

The condenser 101 was connected to a suction fan exhausting a part of the roasting fumes that would not condense at that temperature.

After a residence time in the condenser 101 of about 5 minutes, the finished product discharged had a 3% moisture content.

EXAMPLE 2

Proceeding in accordance with the inventive process and using the apparatus described hereinabove, a coffee powder from seeds ground to an average grain size of 2 mm, dried to a moisture content of 10%, was fed continuously into the roaster 1 at a rate of 100 kg/h.

The wall temperature of the roaster 1 was controlled at 190° C., and the bladed rotor driven at a constant speed of 900 RPM.

After a residence time of about 5 minutes, the roasted powder was transferred along with the roasting fumes into the condenser 101 having its wall temperature controlled at about −2° C. and its bladed rotor driven at the same speed as that of the roaster 1.

The condenser 101 was connected to a suction fan exhausting a part of the roasting fumes that would not condense at that temperature.

After a residence time in the condenser 101 of about 6 minutes, the finished product discharged had an 8% moisture content.

The invention claimed is:

1. A process for producing roasted coffee, or a surrogate therefor, in powder form from seeds selected from the group consisting of seeds obtained from coffee plants, barley, rye, oars, and wheat, the process comprising the steps of:

grinding said seeds into a powder of a predetermined grain size;

drying said powder down to a predetermined moisture content;

continuously feeding a stream of said powder into a roaster comprising a cylindrical tubular body provided with a heating jacket for maintaining the inner wall of said body at a temperature of at least 180° C., with inlet and discharge openings for the powder to be roasted and the roasted powder, respectively, and with a bladed rotor rotatably mounted inside said cylindrical body, the blades of said rotor being helically ranged and oriented to drive the powder to be roasted from said inlet opening to said discharge opening, the bladed rotor of said master being rotated at 500 to 1000 RPM, roasting said powder, with formation of a thin and turbulent dynamic layer in said powder in said roaster and driven by said rotor blades towards the discharge opening of said roaster in heat exchange relationship with the roaster heated wait said blades concurrently mechanically working the powder grains in said thin and turbulent dynamic layer, and continuously discharged a stream of roasted powder and the fumes from the roasting process.

2. A process according to claim 1, wherein said seeds are obtained from fruits of coffee plants, and said powder bus a grain size in the range of 0.5to 2 mm.

3. A process according to claim 2, wherein said powder is dried to a moisture content of 5 to 10%.

4. A process according to claim 1, wherein said wall is maintained at a temperature of 180° to 200° C.

5. A process according to claim 3, further comprising the steps of:

continuously feeding said stream of roasted powder and said roasting fumes issuing from said waster into a condenser comprising a cylindrical tubular body provided with a cooling jacket for maintaining the inner wall of said body at a temperature in the range of −5° C. to 5° C., with inlet and discharge openings for the roasted powder, and with a bladed rotor rotatably mounted inside said cylindrical body, the blades of said rotor being helically arranged and oriented to drive said roasted powder from said inlet opening to said discharge opening; and in said condenser, cooling said roasted powder and roasting fumes, with formation of a thin and turbulent dynamic layer in said roasted powder and roasting fumes in said condenser and driven by the blades of the condenser rotor towards the discharge opening of said condenser in heat exchange relationship with the condenser inner wall, said rotor blades concurrently mechanically working the powder grains in said thin and turbulent dynamic layer.

* * * * *